(12) United States Patent
Wake

(10) Patent No.: US 7,646,153 B2
(45) Date of Patent: Jan. 12, 2010

(54) SWITCHING REGULATOR

(75) Inventor: Hiroki Wake, Chiba (JP)

(73) Assignee: Seiko Instruments Inc., Chiba (JP)

( * ) Notice: Subject to any disclaimer, the term of this patent is extended or adjusted under 35 U.S.C. 154(b) by 113 days.

(21) Appl. No.: 11/702,700

(22) Filed: Feb. 6, 2007

(65) Prior Publication Data

US 2007/0217094 A1    Sep. 20, 2007

(30) Foreign Application Priority Data

Feb. 9, 2006    (JP)    ............................. 2006-032567

(51) Int. Cl.
 *G05F 1/00* (2006.01)
(52) U.S. Cl. .................. 315/291; 315/209 R; 315/224; 315/241 R
(58) Field of Classification Search .................. 315/291, 315/130, 151, 209 R, 224, 241 R, 307, 308, 315/411, DIG. 4, DIG. 5, DIG. 7
See application file for complete search history.

(56) References Cited

U.S. PATENT DOCUMENTS 6,909,249 B2 *    6/2005    Otake ........................... 315/291
7,161,308 B2 *    1/2007    Kanno et al. .................. 315/291

* cited by examiner

*Primary Examiner*—Douglas W Owens
*Assistant Examiner*—Jae K Kim
(74) *Attorney, Agent, or Firm*—Brinks Hofer Gilson & Lione

(57) ABSTRACT

The present invention has an object to provide a switching regulator power supply apparatus that realizes a plurality of light emitting amount outputs without increasing a total number of structural components thereof. A switching regulator power supply apparatus according to the present invention includes a switching type power converting circuit; a current detecting circuit for producing a feedback signal in response to a load current; and an SWR control circuit for driving the power converting circuit. In the switching regulator power supply apparatus, the SWR control circuit is provided with a control signal input terminal and a reference voltage circuit capable of outputting a plurality of reference voltages based upon a control signal inputted to the control signal input terminal.

5 Claims, 4 Drawing Sheets

SWITCHING REGULATOR

This application claims priority under 35 U.S.C. §119 to Japanese Patent Application No. JP2006-032567 filed Feb. 9, 2006, the entire content of which is hereby incorporated by reference.

BACKGROUND OF THE INVENTION

1. Field of the Invention

The present invention relates to a boost type switching regulator for supplying a constant current so as to drive a light emitting diode (referred to as "LED" hereinafter).

2. Description of the Related Art

In various sorts of portable devices employing LEDs as light sources, such as portable telephones, currents to be supplied to the LEDs are required to be controlled at constant values in order to make light emitting amounts, luminance, or chromaticity of the LEDs constant. As power supplies for controlling LED drive currents so as to supply stable and constant currents to loads as described above, boost type switching regulators are utilized.

Switching regulator power supply apparatuses required for driving LEDs produce constant currents which are required in order to produce light emitting amounts, luminance, or chromaticity of the LEDs necessary for users. In most portable devices, the constant currents are fixed. Even when those currents are to be changed, a current required in a fine adjustment is merely changed. Generally, as an example, in a case of switching regulator power supply apparatuses for driving an LED, which are used as LCD panel display back lights of portable telephones and the like, LCD drive currents have been set to such currents capable of obtaining sufficient light emitting amounts required for display operations, and those currents have been set to fixed values.

In the switching regulator power supply apparatus, a constant current for driving the LED is determined by a detecting circuit 5 of FIG. 2. In a normal case, the detecting circuit 5 is constituted by a resistive element and the constant current is set by changing a resistance value of the resistive element. In order to set the light emitting amount of the LED constant as described above, an impedance (resistance value) of the detecting circuit 5 may be connected so as to become a predetermined impedance.

Also, a drive current ILED of the switching regulator power supply apparatus and a resistance value RLED of the detecting circuit 5 are expressed by the following equation.

$$ILED = VREF/RLED$$

In this case, ILED is a current which is supplied to a load 6, and corresponds to a constant current for driving the LED. VREF is an output voltage value of a reference voltage circuit provided in an SWR control circuit 4. Further, resistance value RLED is an impedance (resistance value) of the detecting circuit 5. The switching regulator power supply apparatus is operated in such a manner that a voltage difference generated by the current (=ILED) flowing through the impedance of the detecting circuit 5 becomes equal to the reference voltage value VREF of the reference voltage circuit provided in the SWR control circuit 4. In other words, a load current is stabilized to become the above-mentioned current ILED by turning on/off a switching transistor by a drive signal whose duty ratio is determined by a feedback signal in response to the load current.

FIG. 3 is a block diagram for showing an SWR control circuit 4 of a conventional switching regulator. The SWR control circuit 4 includes an input terminal 11, a reference voltage circuit 19, an error amplifying circuit 13, a triangular wave oscillating circuit 14, a comparator 15, and a buffer circuit 16. The input terminal 11 is used for inputting a feedback signal from a detecting circuit 5. The reference voltage circuit 19 outputs a reference voltage. The error amplifying circuit 13 amplifies a voltage difference between the reference voltage and the feedback signal. The triangular wave oscillating circuit 14 outputs a triangular wave signal. The comparator 15 compares the triangular wave signal with a signal outputted from the error amplifying circuit 13 to generate an output signal. The buffer circuit 16 converts the output signal of the comparator 15 into a drive signal, which makes it possible to drive a switching transistor Q1 provided in a power converting circuit 3.

The SWR control circuit 4 controls the switching transistor Q1 in such a manner that the feedback signal becomes equal to the reference voltage. The output of the reference voltage circuit is at a predetermined constant voltage level, so a current flowing through the load 6 is controlled to become a constant current based upon a voltage of the detecting circuit 5 and the reference voltage circuit 19 provided in the SWR control circuit 4.

Recently, since there are increasing portable devices which require a plurality of LEDs, the detecting circuit 5 or other such technique which involves connection to a single impedance is not sufficient for setting the light emitting amount of the LED constant, so a detecting circuit having a plurality of impedances corresponding to a plurality of light emitting amount outputs is necessary.

FIG. 4 is a block diagram for showing a conventional boost type switching regulator power supply apparatus for driving an LED, which corresponds to a plurality of light emitting amount outputs (refer to, for example, JP-A-2004-194448). A detecting circuit 7 corresponding to the plurality of light emitting amount outputs includes, when two levels of outputs are required, for example, a first resistive element and a second resistive element both of which are connected in parallel to each other, and a switching transistor. The switching transistor controls with a control signal which is inputted from a terminal 8 for switching output levels. Similarly, when two levels or higher levels of outputs are required, the detecting circuit 7 can be additionally provided with the resistive elements and the switching transistors if necessary.

However, in a case where a switching regulator power supply apparatus for driving an LED, which corresponds to the light emitting amount outputs of a plurality of levels is to be constituted, the resistive elements required for setting the light emitting amounts and the switching transistors controlled by the switching control signals are required. As a result, a total number of elements required for the power supply apparatus is increased, accompanied by an increase of a mounting area thereof, which impedes a reduction of costs and an area saving effect (namely, high density mounting effect).

SUMMARY OF THE INVENTION

Therefore, the present invention has an object to provide a switching regulator power supply apparatus capable of realizing a plurality of light emitting amount outputs without increasing a total number of structural components thereof which may impede a reduction of costs and an area saving effect in various sorts of portable devices which require the plurality of light emitting amount outputs.

To achieve the above-mentioned object, a switching regulator power supply apparatus according to an aspect of the present invention is equipped with a switching type power converting circuit; a current detecting circuit for producing a feedback signal in response to a load current; and an SWR control circuit for driving the power converting circuit. In the switching regulator power supply apparatus, the SWR control circuit is provided with a control signal input terminal and a reference voltage circuit capable of outputting a plurality of reference voltages based upon a control signal inputted to the control signal input terminal.

According to the switching regulator power supply apparatus of the present invention, the reference voltage circuit switches the plurality of reference voltages by the control signal inputted to the control signal input terminal to output the switched reference voltage. As a result, it is possible to provide the switching regulator power supply apparatus capable of outputting the plurality of light emitting amounts with a single resistor in the portable devices which require the plurality of light emitting amounts, without a provision of a plurality of external elements such as resistors and switching transistors in a detecting circuit. Accordingly, low cost and area saving can be realized.

DETAILED DESCRIPTION OF THE PREFERRED EMBODIMENTS

Embodiment

Figure 2:
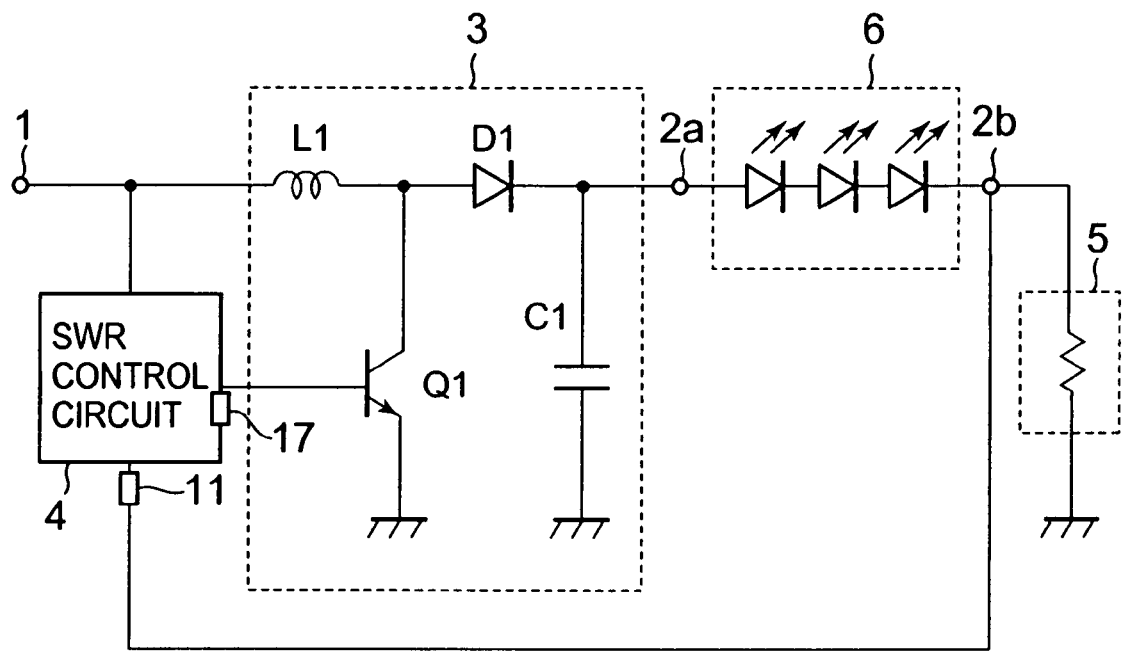
FIG. 2 is a block diagram for showing a boost type switching regulator power supply apparatus.
Figure 3:
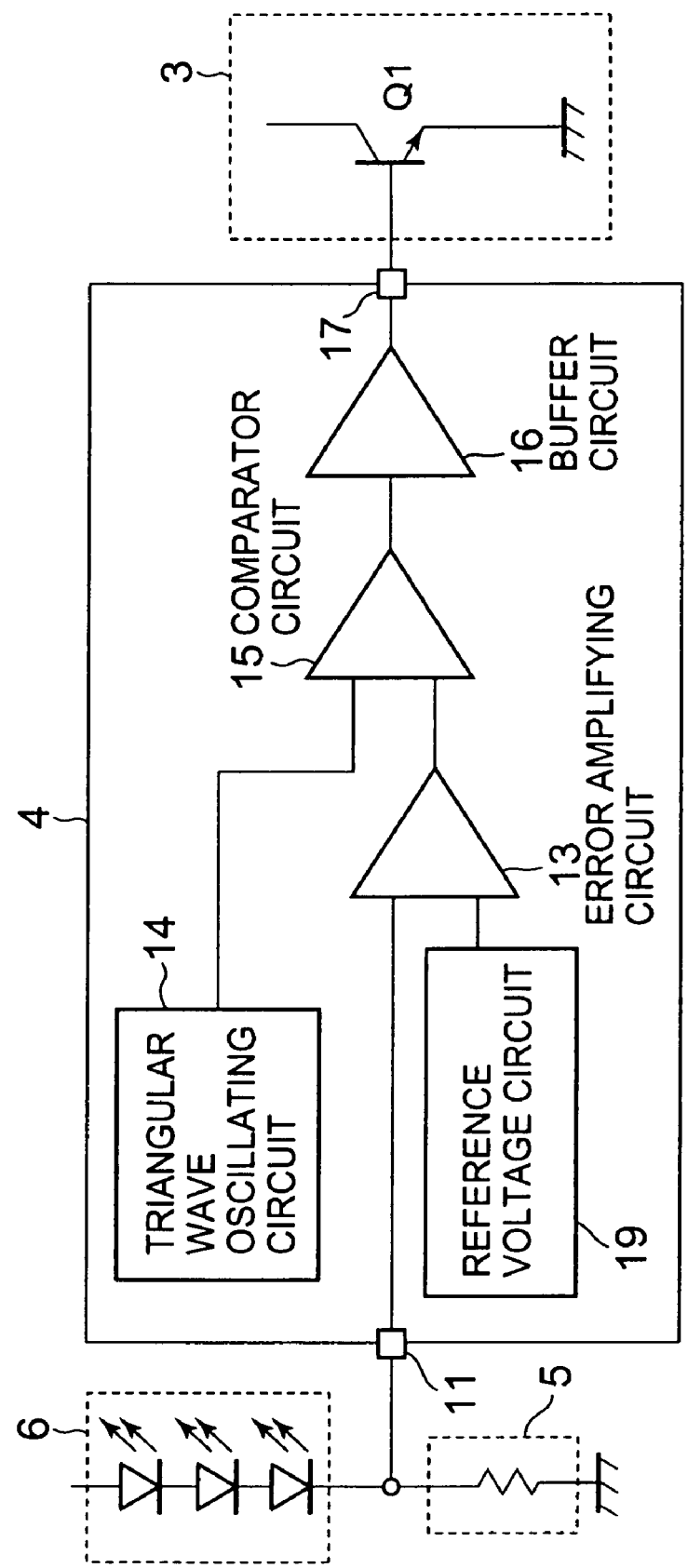
FIG. 3 is a block diagram for showing an SWR control circuit of a conventional switching regulator.
Figure 4:
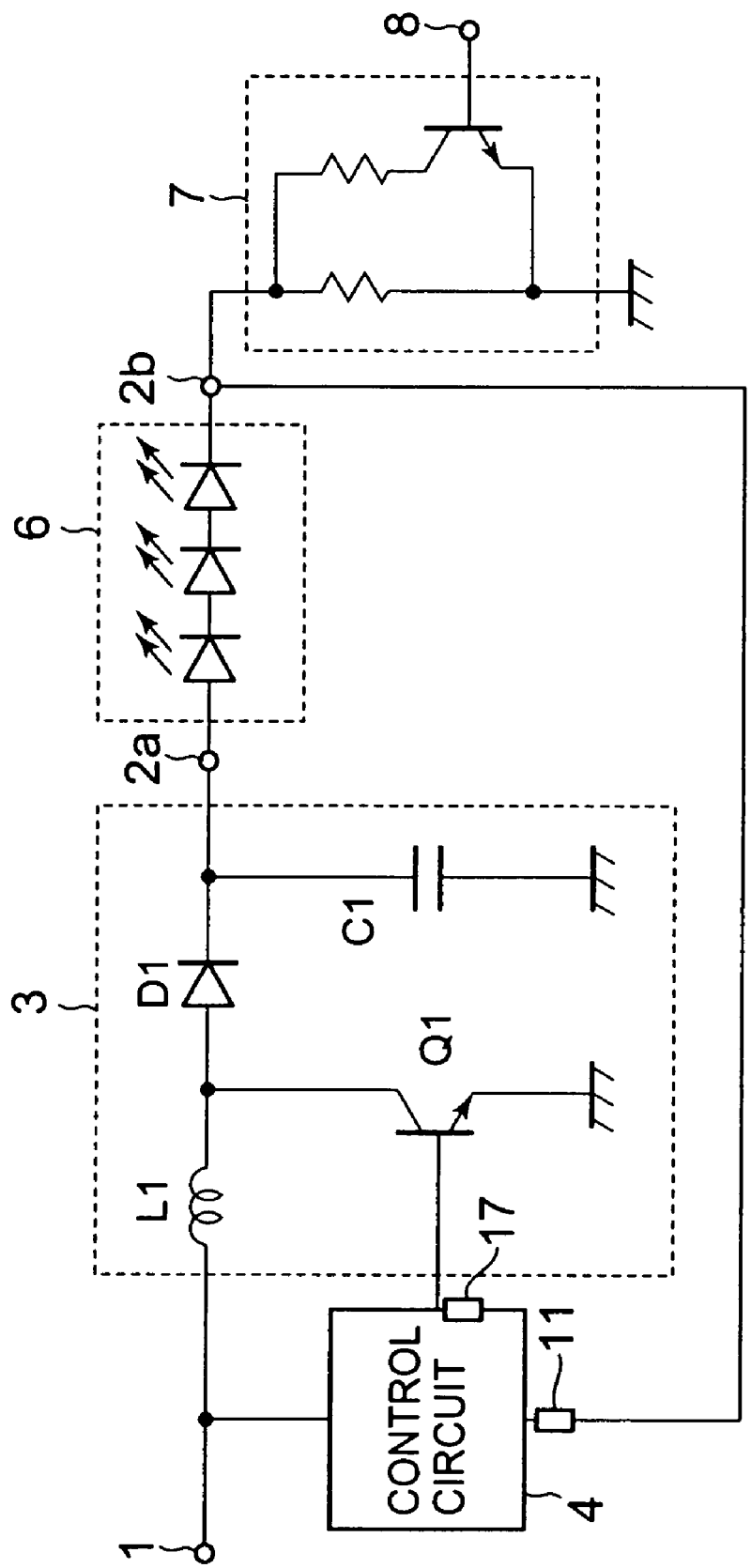
FIG. 4 is a block diagram for showing a conventional boost type switching regulator power supply apparatus corresponding to a plurality of light emitting amount outputs.

FIG. 2 is a block diagram of a boost type switching regulator power supply apparatus. The boost type switching regulator power supply apparatus includes a battery power input terminal 1, a power converting circuit 3, an SWR control circuit 4 for controlling the power converting circuit 3, and a load current detecting circuit 5. The power converting circuit 3 converts electric power of a battery into electric power capable of driving a load 6 (namely, LED).

One end of a choke coil L1 is connected to the input terminal 1, whereas a switching transistor Q1 and a rectification Schottky diode D1 are connected to the other end of the choke coil L1. Also, a cathode of the rectification Schottky diode D1 is connected to an output terminal 2a and a smoothing capacitor C1. The detecting circuit 5 is connected between the other output terminal 2b and the ground functioning as a reference potential point of the circuit. The detecting circuit 5 detects a load current flowing through the load 6 so as to produce a feedback signal in response to the detected load current. The SWR control circuit 4 for driving the power converting circuit 3 is connected to the output terminal 2b.

Next, a description is made of operations of the switching regulator power supply apparatus shown in FIG. 2. The SWR control circuit 4 turns on/off the switching transistor Q1 by a drive signal having a duty ratio corresponding to a feedback signal from the detecting circuit 5. It should be noted that the above-mentioned feedback signal does not have a signal amount corresponding to an output voltage in the normal switching regulator power supply apparatus, but a signal amount corresponding to an output current which is the load current. As a result, the switching transistor Q1 performs turning on/off operations based upon the drive signal having the on-duty ratio corresponding to the load current, which leads to stabilization of the load current.

In the case where a load current is lower than a stabilizing current, a voltage between the terminals of the smoothing capacitor C1 is boosted in order to increase the load current. On the other hand, in the case where a load current is higher than a stabilizing current, charge of the smoothing capacitor C1 is consumed by the load current in order to lower the voltage across the terminals of the smoothing capacitor C1, leading to a decrease of the load current.

Figure 1:
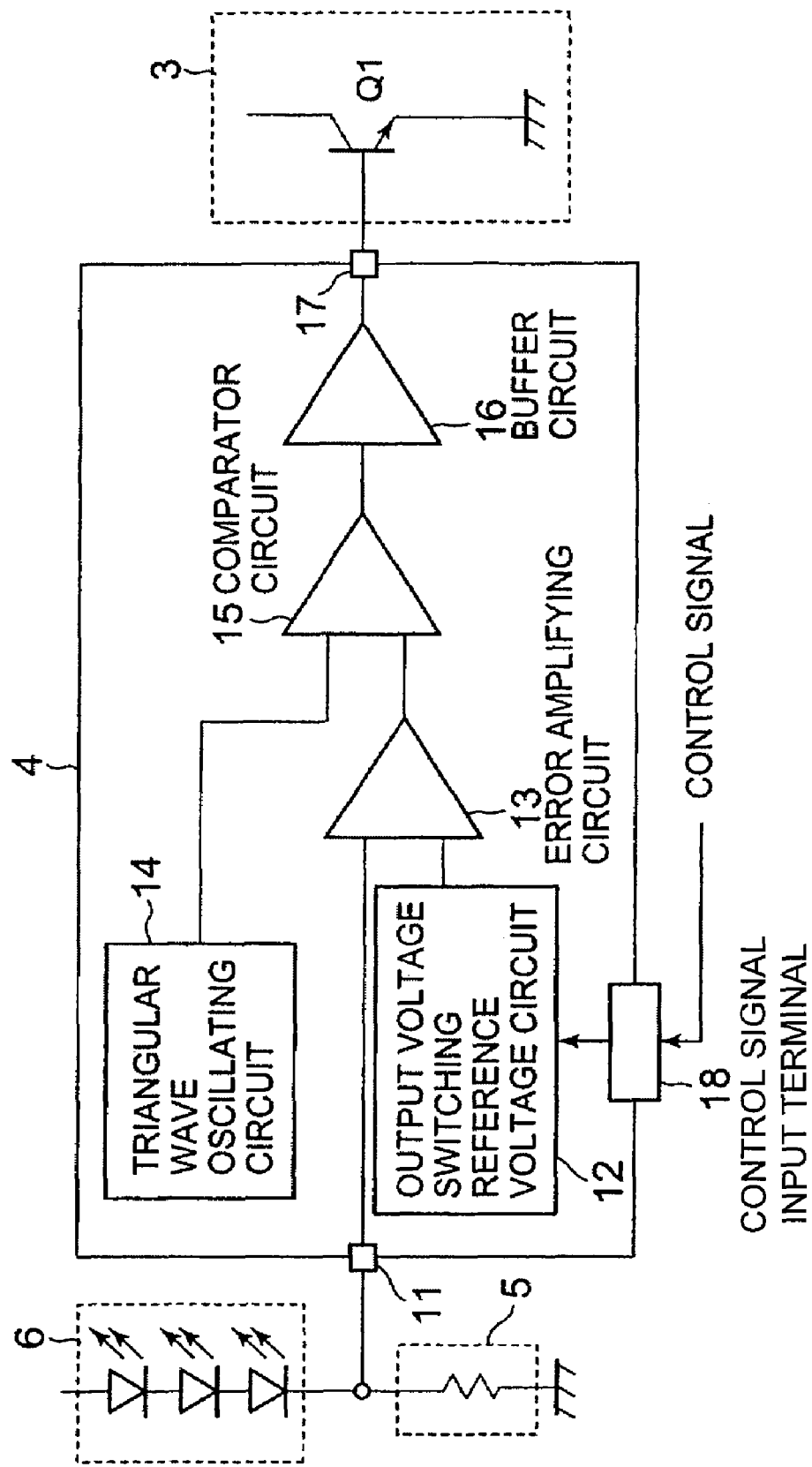
FIG. 1 is a block diagram for showing an SWR control circuit of a switching regulator according to the present invention.

FIG. 1 is a block diagram for showing the SWR control circuit 4 of the switching regulator power supply apparatus of the present invention. The SWR control circuit 4 shown in the block diagram of FIG. 1 includes a terminal 11, a reference voltage circuit 12, an error amplifying circuit 13, a triangular wave oscillating circuit 14, a comparator 15, a buffer circuit 16, and a control signal input terminal 18. The terminal 11 is used for inputting a feedback signal corresponding to a load current detected by the detecting circuit 5 and flowing through the load 6. The reference voltage circuit 12 outputs a reference voltage. The error amplifying circuit 13 amplifies a voltage difference between the reference voltage and the feedback signal. The triangular wave oscillating circuit 14 outputs a triangular wave signal. The comparator 15 compares the triangular wave signal with a signal outputted from the error amplifying circuit 13 to generate an output signal. The buffer circuit 16 converts the output signal of the comparator 15 into a drive signal with which driving of the switching transistor Q1 provided in the power converting circuit 3 becomes possible. The control signal input terminal 18 is used for inputting a control signal from an external source. In the SWR control circuit 4, the reference voltage circuit 12 has a function of outputting a plurality of reference voltages based upon the control signal inputted to the control signal input terminal 18.

In the switching regulator power supply apparatus for driving an LED, which is equipped with the SWR control circuit 4 as described above, by constructing the detecting circuit with only one resistive element, a plurality of light emitting amount outputs can be realized which have not been possible with the conventional switching regulator power supply apparatus.

Next, a method of realizing the plurality of light emitting amount outputs in the present invention will be described in detail by way of an example. For example, it is assumed that the reference voltage of the reference voltage circuit 12 can be set to 0.5 V and 1.0 V. The reference voltage can be set based upon control signals inputted to the control signal input terminal 18. For instance, it is assumed that the reference voltage is set to 0.5 V when a control signal of a low level is inputted, whereas the reference voltage is set to 1.0 V when a control signal of a high level is inputted. It is also assumed that a resistor having a resistance value of 5 ohm is connected to the detecting circuit 5. The resistive element to be connected to the detecting circuit 5 is a single resistive element, so a plurality of resistive elements or switching transistors are not required.

The above-mentioned switching regulator power supply apparatus is operated in such a manner that a voltage difference produced by a current (=ILED) flowing through a resistor of the detecting circuit 5 becomes equal to the reference voltage VREF of the reference voltage circuit 12, and the switching transistor Q1 is turned on/off by the drive signal having the duty ratio corresponding to the feedback signal produced in response to the load current, leading to the stabilization of the load current to the current ILED.

The load current ILED is expressed by the following formula in accordance with the reference voltage VREF and a resistance value of a resistor provided in the detecting circuit 5.

$$ILED = VREF/RLED$$

In a case where an input of the control signal input terminal 18 is a low level, the reference voltage VREF is set to 0.5 V, so a constant current of 100 mA flows through the LED which constitute the load 6. Also, in a case where an input of the control signal input terminal 18 is a high level, the reference voltage VREF is set to 1.0 V, so a constant current of 200 mA flows through the LED which constitute the load 6. Since the light emitting amount of the LED is proportional to the current flowing therethrough, the input of the control signal input terminal 18 is set to a high level so that the LED can emit bright light.

As described above, by controlling the input of the control signal input terminal 18, LED turn-on modes such as the normal LED turn-on and the flash emission LED turn-on, which require different light emitting amounts can be realized. The above-mentioned flash emission LED turn-on mode is a mode in which the LED emits light in a flickering manner with higher luminance than the normal LED turn-on mode.

In this embodiment, the LED luminance has been set to two stages. However, by allowing the reference voltage of the reference voltage circuit 12 to be set to a plurality of stages, it becomes possible for the switching regulator power supply apparatus to correspond to the plurality of stages of LED luminance without increasing the number of structural elements of the detecting circuit 5.

What is claimed is:

1. A switching regulator control circuit, comprising:
   a feedback signal terminal for inputting thereinto a feedback signal produced in response to a current flowing through a load, where the load comprises a LED;
   a reference voltage circuit configured to output one of a plurality of discrete reference voltages based on a control signal, where each discrete reference voltage corresponds to one of a plurality of different luminance stages of the LED;
   an error amplifying circuit for inputting thereinto the feedback signal and the one of the plurality of discrete reference voltages to amplify a difference therebetween;
   a triangular wave oscillating circuit for oscillating a triangular wave; and
   a comparator for comparing an output signal of the error amplifying circuit with the triangular wave to output a switching signal,
   wherein the reference voltage circuit is further configured to switch between the plurality of discrete reference voltages based upon the control signal to output a switched reference voltage.

2. The switching regulator control circuit according to claim 1, further comprising a terminal for inputting the control signal from an external source.

3. A switching regulator power supply apparatus, comprising:
   a power supply input terminal for inputting thereinto electric power of a power supply;
   a switching type power converting circuit for converting the electric power into electric power capable of driving a load;
   the load which is driven by the electric power of the power converting circuit;
   a current detecting circuit for producing a feedback signal in response to a current flowing through the load; and
   the switching regulator control circuit for driving the power converting circuit in response to a feedback signal the switching regulator control circuit comprising: a feedback signal terminal for inputting thereinto a feedback signal produced in response to a current flowing through a load, where the load comprises a LED; a reference voltage circuit configured to output one of a plurality of discrete reference voltages based on a control signal, where each discrete reference voltage corresponds to one of a plurality of different luminance stages of the LED; an error amplifying circuit for inputting thereinto the feedback signal and the one of the plurality of discrete reference voltages to amplify a difference therebetween; a triangular wave oscillating circuit for oscillating a triangular wave; and a comparator for comparing an output signal of the error amplifying circuit with the triangular wave to output a switching signal, wherein the reference voltage circuit is further configured to switching between the plurality of discrete reference voltages based upon the control signal to output a switched reference voltage.

4. The switching regulator power supply apparatus according to claim 3, wherein:
   the load includes an LED; and
   and a current supplied to the LED is switched to change luminance.

5. The switching regulator power supply apparatus according to claim 4, wherein the LED emits light by switching between at least a normal LED turn-on condition and an LED flash emitting condition.

* * * * *